(12) United States Patent
Geren et al.

(10) Patent No.: US 6,400,587 B1
(45) Date of Patent: Jun. 4, 2002

(54) UNIVERSAL INPUT FLYBACK WITH SECONDARY SHUNT VOLTAGE LIMITER

(75) Inventors: Michael D Geren, Suwanee; Ashok Patil, Duluth, both of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/995,505

(22) Filed: Nov. 28, 2001

(51) Int. Cl.$^7$ .................. H02H 7/122; H02M 3/335
(52) U.S. Cl. ................. 363/56.11; 363/21.15
(58) Field of Search .................. 363/16, 20, 21.01, 363/21.12, 21.15, 55, 56.01, 56.09, 56.11, 95, 97, 131

(56) References Cited

U.S. PATENT DOCUMENTS 5,675,485 A * 10/1997 Seong ................. 363/97
5,982,640 A * 11/1999 Naveed et al. ........... 363/21
6,307,758 B1 * 10/2001 Geren ................. 363/21.15

* cited by examiner

*Primary Examiner*—Matthew Nguyen
(74) *Attorney, Agent, or Firm*—Philip H. Burrus, IV; Bockhop & Reich, LLP

(57) ABSTRACT

A clamp circuit for limiting output voltage from a power supply secondary inductor to a ground when a first secondary node has a first secondary node voltage above a predetermined value relative to ground includes a silicone controlled rectifier and a control circuit. The silicone controlled rectifier has a first anode that is electrically coupled to the first secondary node of the secondary inductor, a first cathode that is electrically coupled to the secondary ground, and a first gate. The control circuit is electrically coupled to the first secondary node and to the gate of the silicon controlled rectifier. The control circuit senses the first secondary node voltage and applies a control voltage to the gate of the silicon controlled rectifier when the first secondary node voltage is above the predetermined value. The control voltage is sufficient to drive the silicon controlled rectifier into a substantially conductive state so that the silicon controlled rectifier clamps the first secondary node by sinking substantially all current received from the first secondary node to the ground.

4 Claims, 1 Drawing Sheet

UNIVERSAL INPUT FLYBACK WITH SECONDARY SHUNT VOLTAGE LIMITER

BACKGROUND OF THE INVENTION

1. Field of the Invention

The present invention relates to electrical power supplies and, more specifically, to power supplies employing over-voltage protection devices.

2. Description of the Prior Art

Existing power supplies, such as those used in lithium ion battery chargers, often employ a mechanism in which a pair of inductors are used to source current from a DC source to a load (i.e., the charger). Typically, a primary inductor stores energy from the DC source in the form of a magnetic field and a control circuit intermittently interrupts current flow through the primary inductor, thereby causing the magnetic field to collapse. A portion of the magnetic field collapses onto a secondary inductor that is electrically coupled to the load. The collapsing magnetic field induces a current in the secondary inductor, thereby supplying current to the load. A feedback circuit is used to indicate to control circuit when the secondary side voltage is below a predetermined level. The control circuit then causes an interruption of the current through the primary inductor, thereby causing a transfer of energy to the secondary inductor. Once the control circuit senses that the voltage on the secondary side is below the predetermined level, current flow through the primary inductor is allowed to resume, thereby storing energy in anticipation of a subsequent energy transfer.

The feedback circuit may fail in such a way that the control circuit never senses the secondary side voltage rising above the predetermined level. Thus, energy will continue to be transferred to the secondary side, thereby causing the secondary side voltage to rise above the normal operating voltage of the load. Such a rise in voltage may be undesirable in battery chargers for various reasons.

Therefore, there is a need for a circuit that prevents over-voltage conditions on a power supply secondary side upon the occurrence of a failure of a feedback circuit.

DETAILED DESCRIPTION OF THE INVENTION

Figure 1:
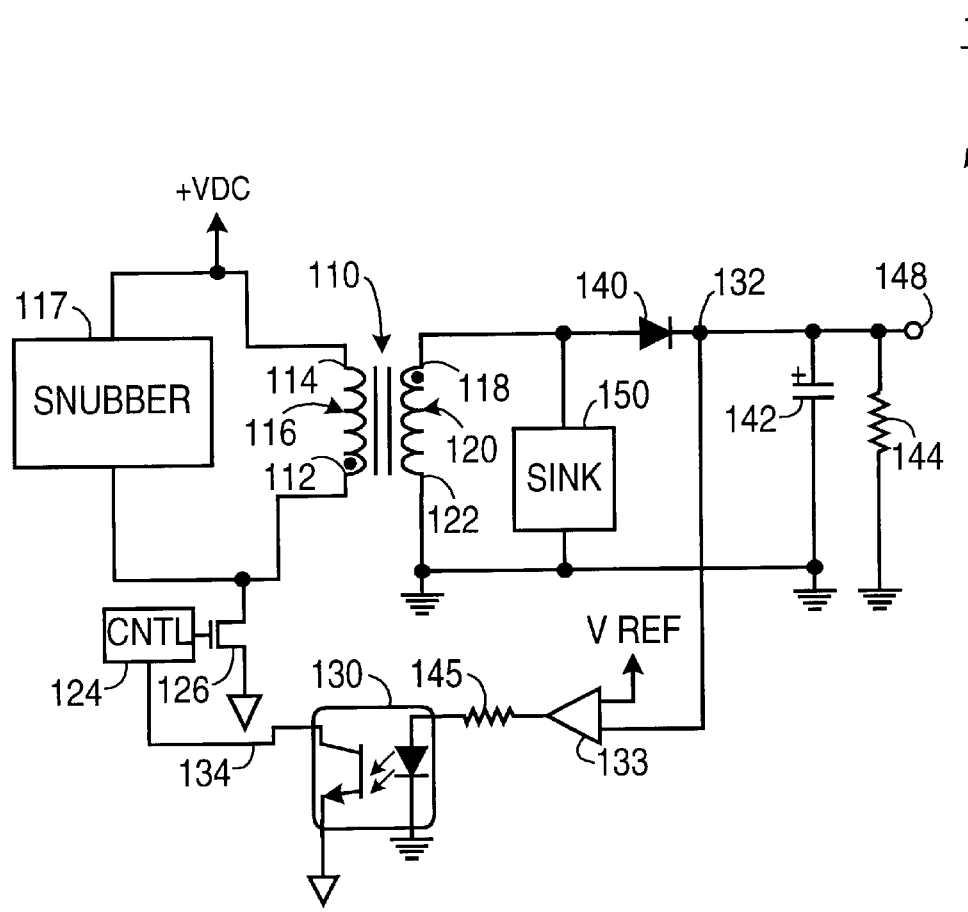
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of the invention is a power supply circuit 100 for sourcing electric power from a DC source (VDC), which is typically a direct current taken from a bridge rectified alternating current, to a load node 148. Typically, the load node 148 would supply a load, such as a battery charger.

The power supply circuit 100 includes a pair of inductors 110 that act in the manner of a transformer. The pair of inductors 110 includes a primary inductor 112 and a secondary inductor 118. The primary inductor 112 has a first primary node 114 in electrical communication with the DC source and a second primary node 116. The secondary inductor 118 has a first secondary node 120, in electrical communication with the load node 148 and a second secondary node 122 in electrical communication with a secondary ground. Each of the pair of inductors 110 is wound around a separate portion of a common core so as to be in magnetic field communication with each other. The pair of inductors 110 is used to regulate the voltage being supplied to the load node 148. A snubber 117 may be placed in parallel with the primary inductor 112 to mitigate the effects of transients caused by energy stored in the leakage inductance.

A rectifying diode 140 is in series with the secondary inductor 118 and a capacitor 142 is in series with the rectifying diode 140 with respect to the current path from the first secondary node 120 to the secondary ground. A resistor 144 may also be placed in parallel with the capacitor 142.

A control switch 126 electrically couples the second primary node 116 to a primary ground and is capable of selectively decoupling the second primary node 116 from the primary ground. When the control switch 126 is closed, current flows from the DC source through the primary inductor 112 to ground and the primary inductor 112 stores energy in the form of a magnetic field. When the control switch 112 is opened, a portion of the magnetic field collapses onto the secondary inductor 118, thereby transferring the stored energy to the secondary inductor 118 in the form of a current flowing therethrough.

An error amplifier 133 senses a secondary voltage between the secondary ground and a selected node 132 disposed between the first secondary node 118 and the load node 148. The error amplifier 133 generates a current control signal through resistor 145 that is representative of the secondary voltage. A feedback coupler 130, such as an optical isolator, transfers the current control signal from the secondary side to a secondary feedback signal 134.

A controller 124 is responsive to the secondary feedback signal 134 and selectively causes the control switch 126 to decouple the second primary node 116 from the primary ground when the secondary feedback signal 134 indicates that the selected node 132 has a voltage below a predetermined level, thereby inducing a current in the secondary inductor 118. For example, if a field effect transistor is used for the control switch 124, the controller 124 would be coupled to the gate of the field effect transistor so as to allow the controller to turn the field effect transistor "off" and "on."

Figure 2:
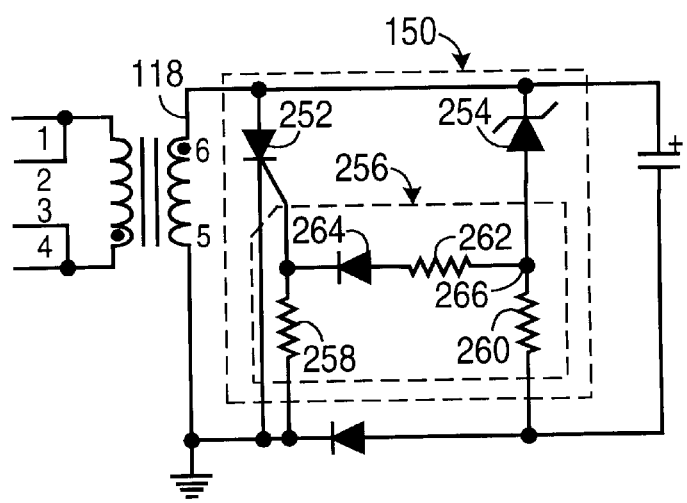
FIG. 2 is a schematic diagram of a recirculation circuit according to the embodiment of shown in FIG. 1.

The power supply circuit 100 includes a clamp circuit 150 for limiting output voltage and for sinking current from the power supply secondary inductor 120 to a ground when the first secondary node 118 has a first secondary node voltage above a predetermined value relative to ground. As shown in FIG. 2, the clamp circuit 150 includes a silicone controlled rectifier (SCR) 252 that selectively sinks current from the first secondary node 118 to ground. The gate of the SCR 252 is driven by a control circuit that includes a Zener diode 254 and a gate activation circuit 256. The Zener diode 254 is biased so that it enters the reverse current breakdown state when the voltage at the first secondary node 118 exceeds the predetermined voltage (e.g., 6.8 V for a typical Zener diode). Once in the breakdown state, current flowing from the first secondary node 118 through the Zener diode 254 is current divided at node 266 into resistor 262 and resistor 260. The current flowing through resistor 262 also flows through diode 264 and is divided between the gate of the SCR 252 and resistor 258, with most of the current flowing into the gate of the SCR 252. The gate current reduces the ability of the SCR 252 to support applied voltage across the anode/cathode of the SCR 252, thus causing breakover to occur, turning "on" SCR 252. Once the breakover voltage at the gate of the SCR 252 is reached, the SCR 252 is turned "on." The SCR 252 then stays "on," conducting substantially all current from the first secondary node 118 to ground, until the current out of the first secondary node 118 goes below the threshold for the SCR 252, at which time the SCR 252 turns "off."

In operation, if the feedback coupler 130 fails, the controller 124 will sense that the voltage at the selected node 132 on the secondary side is below the predetermined level, even though the voltage may be well above the predetermined level. This will cause the controller 124 to continue to drive current through the pair of inductors 110 in an attempt to bring the voltage at the selected node 132 above the predetermined level. Thus, the voltage at the selected node 132 will continue upward until the selected node 132 voltage reaches the breakdown voltage of the Zener diode 254. This causes the Zener diode 254 to begin conducting, which will cause the gate activation circuit 256 to turn the SCR 252 "on," as described above. This causes substantially all current from the first secondary node 118 to be sourced to ground, thereby preventing an improper voltage at the load node 148.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A clamp circuit for limiting output voltage from a power supply secondary inductor, having a first secondary node, to a ground when the first secondary node has a first secondary node voltage above a predetermined value relative to ground, comprising:
   a. a silicone controlled rectifier having a first anode that is electrically coupled to the first secondary node of the secondary inductor, a first cathode that is electrically coupled to the secondary ground, and a first gate; and
   b. a control circuit, electrically coupled to the first secondary node and to the gate of the silicon controlled rectifier, that senses the first secondary node voltage and that applies a control voltage to the gate of the silicon controlled rectifier when the first secondary node voltage is above the predetermined value, the control voltage being sufficient to drive the silicon controlled rectifier into a substantially conductive state so that the silicon controlled rectifier clamps the first secondary node by sinking substantially all current received from the first secondary node to the ground.

2. The clamp circuit of claim 1, wherein the control circuit comprises:
   a. a Zener diode having a second anode and a second cathode that is electrically coupled to the first secondary node, the Zener diode biased so as to allow current to flow from the second cathode to the second anode when the voltage between the first secondary node and ground is above the predetermined value; and
   b. a silicon controlled rectifier gate activation circuit, responsive to current flowing from the second anode, that applies the control voltage to the gate of the silicon controlled rectifier when current flows from the second cathode to the second anode.

3. The clamp circuit of claim 2, wherein the silicon controlled rectifier gate activation circuit comprises:
   a. a first resistor that electrically couples the first gate of the silicon controlled rectifier to the ground;
   b. a second resistor that electrically couples the second anode of the Zener diode to the ground;
   c. a diode having a third anode that is electrically coupled to the second anode of the Zener diode and a third cathode that is electrically coupled to the first gate of the silicone controlled rectifier; and
   d. a third resistor electrically coupling the second anode of the Zener diode to the third anode of the rectifying diode, the resistance of the first resistor, the second resistor and the third resistor each being selected so that when the voltage between the first secondary node and ground is greater than the predetermined value, a portion of a current flowing from the second anode of the Zener diode will flow into the gate of the silicon controlled rectifier.

4. A power supply circuit for sourcing electric power from a DC source to a load node, comprising:
   a. a pair of inductors, including:
      i. a primary inductor having a first primary node in electrical communication with the DC source and a second primary node; and
      ii. a secondary inductor having a first secondary node, in electrical communication with the load node and a second secondary node in electrical communication with a secondary ground;
      each of the pair of inductors being wound around a separate portion of a common core so as to be in magnetic field communication with each other;
   b. a rectifying diode in series with the secondary inductor;
   c. a capacitor, in series with the rectifying diode with respect to the secondary ground;
   d. a control switch, electrically coupling the second primary node to a primary ground and capable of selectively decoupling the second primary node from the primary ground;
   e. a controller, responsive to a secondary feedback signal, that selectively causes the control switch to decouple the second primary node from the primary ground when the secondary feedback signal indicates that the first secondary node has a voltage below a predetermined level, thereby inducing a current in the secondary inductor;
   f. a silicon controlled rectifier having an anode that is electrically coupled to the first secondary node of the secondary inductor, a cathode that is electrically coupled to the secondary ground, and a gate;
   g. a Zener diode that electrically couples the first secondary node to the secondary ground and that is biased so that the Zener diode is substantially non-conductive if a voltage between the first secondary node and the ground is below a predetermined value and so that the Zener diode is substantially conductive if a voltage between the first secondary node and the ground is not below the predetermined value; and
   h. a gate circuit that applies a predetermined voltage to the gate of the silicon controlled rectifier when the Zener diode is substantially conductive, thereby causing the silicon controlled rectifier to clamp the first secondary node by sinking substantially all current from the first secondary node to the secondary ground.

* * * * *